(12) United States Patent
Bhudavaram et al.

(10) Patent No.: US 9,495,410 B1
(45) Date of Patent: *Nov. 15, 2016

(54) FILE CREATION THROUGH VIRTUAL CONTAINERS

(71) Applicant: International Business Machines Corporation, Armonk, NY (US)

(72) Inventors: Dinesh K. Bhudavaram, Bangalore (IN); Shubjit Naik, Bangalore (IN); Srivatchsan Uthamanathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/171,544

(22) Filed: Jun. 2, 2016

Related U.S. Application Data

(63) Continuation of application No. 14/972,132, filed on Dec. 17, 2015, now Pat. No. 9,389,931, which is a continuation of application No. 14/837,125, filed on Aug. 27, 2015.

(51) Int. Cl.
*G06F 7/00* (2006.01)
*G06F 17/30* (2006.01)
*G06F 9/54* (2006.01)

(52) U.S. Cl.
CPC ......... *G06F 17/30371* (2013.01); *G06F 9/543* (2013.01); *G06F 17/30129* (2013.01); *G06F 17/30233* (2013.01)

(58) Field of Classification Search
CPC ...................................................... G06F 9/543
See application file for complete search history.

(56) References Cited

U.S. PATENT DOCUMENTS

| 8,020,112 | B2 | 9/2011 | Ozzie et al. |
| 8,510,649 | B2 | 8/2013 | Isidore |
| 8,555,187 | B2 | 10/2013 | Margolin |
| 9,389,931 | B1 | 7/2016 | Bhudavaram et al. |
| 2011/0125970 | A1 | 5/2011 | Commarford et al. |
| 2015/0012861 | A1 | 1/2015 | Loginov |

OTHER PUBLICATIONS

"Shapeshifter (Clipboard manager)", © Flamefusion 2015, 4 pages, <http://flamefusion.net/software/shapeshifter-clipboard-manager>.
"PasteAsFile: Save Images & Text From Your Clipboard Directly To Any Folder [Windows]", © MakeUseOf 2014, 3 pages, <http://www.makeuseof.com/tag/pasteasfile-save-images-text-clipboard-folder-windows/>.
Bhudavaram et al., "File Creation Through Virtual Containers", U.S. Appl. No. 14/837,125, 34 pages, filed on Aug. 27, 2015.
Appendix P, List of IBM Patents or Patent Applications Treated as Related, 2 pages, dated Jul. 18, 2016.

*Primary Examiner* — Ajith Jacob
(74) *Attorney, Agent, or Firm* — Christopher McLane; Daniel R. Simek

(57) ABSTRACT

In an approach for creating a file, a computer receives a selection on a selection of content within application software on a first computing device to transfer to a clipboard. The computer appends metadata of the received selection with metadata indicating application software and file association information that corresponds to the selected content. The computer receives an indication to paste the selected content from the clipboard to a second computing device. The computer determines whether compatible application software on the second computing device is capable of accepting the selected content included in the received indication to paste. The computer responsive to determining that compatible application software on the second computing device is not capable of accepting the selected content included in the received indication to paste, creates a file that includes the selected content included in the received indication to paste and appended metadata.

1 Claim, 3 Drawing Sheets

FILE CREATION THROUGH VIRTUAL CONTAINERS

BACKGROUND OF THE INVENTION

The present invention relates generally to the field of data transfer, and more particularly to creating a virtual container for the storage and viewing of transferred data when an appropriate destination is unavailable.

Container-based virtualization, also called operating system virtualization, is an approach to virtualization in which the virtualization layer runs as an application within the operating system (OS). When utilizing operating-system-level virtualization, the operating system kernel runs on the hardware node with multiple isolated user space containers, also called virtual containers (e.g., memory where application software executes), installed on top that are simulated. The virtual container includes an application engine, packaging infrastructure, and runtime libraries that allow the application software to run anywhere. When a user accesses the virtual container, the virtual container responds and maintains the appearance of an actual computing device as the virtual container incorporates features that limit, account for, and isolate the resource usage of a process and/or collection of processes (e.g., instance of a computer program being executed).

When users of a computing device access, create, and/or update files through application software, the users may utilize a clipboard in conjunction with a clipboard manager to assist in performing the associated tasks. The clipboard is a set of functions and messages that enables application software to transfer data. As all applications have access to the clipboard, data can be easily transferred between applications and/or within an application. The clipboard manager is a computer program that adds functionality to the clipboard of an operating system. Clipboard managers enhance the basic functions of cut, copy, and paste operations with one or more features, such as multiple buffers and the ability to merge, split, and edit contents; selecting the buffer to store data from a cut or copy; selecting the buffer the paste data should be retrieved from; handling formatted text, tabular data, data objects, media content, and uniform resource locators (URLs); saving copied data to long term storage; indexing and/or tagging clipped data; and searching saved data.

When data is transferred to the clipboard, the selection may also include embedded metadata. Metadata is structured information that describes, explains, locates, or otherwise makes it easier to retrieve, use, or manage an information resource (e.g., document files, digital images, videos, spreadsheets, and web pages). Three types of metadata include: descriptive (e.g., discovery and identification), structural (e.g., how compound objects are put together), and administrative (e.g., assists to manage a resource). Metadata can be embedded in a digital object (e.g., HTML documents, headers of image files) or stored separately (e.g., database linked to objects described). Internal or embedded metadata stays with the data being described and is available with the data and can be manipulated locally. External or stored metadata allows collocation metadata for all the contents for more efficient searching and management.

SUMMARY

Aspects of the present invention disclose a method, computer program product, and system for creating a file. The method includes one or more computer processors receiving a selection of content within application software on a first computing device to transfer to a clipboard. The method further includes one or more computer processors appending metadata of the received selection with metadata indicating application software and file association information that corresponds to the selected content. The method further includes one or more computer processors receiving an indication to paste the selected content from the clipboard to a second computing device. The method further includes one or more computer processors determining whether compatible application software on the second computing device is capable of accepting the selected content included in the received indication to paste. The method further includes, responsive to determining that compatible application software on the second computing device is not capable of accepting the selected content included in the received indication to paste, one or more computer processors creating a file that includes the selected content included in the received indication to paste and append metadata.

DETAILED DESCRIPTION

Computer files are resources for storing information that are available to a computer program. Computer files may be transferred to another location within a client device (e.g., moved to another directory on the same computing device) or transferred to another target client device connected over a network (e.g., server, client device, LAN drive, etc.) through available actions, such as cut, copy, paste, save, etc., irrespective of compatible computer programs being available on the target client device. As recognized by embodiments of the present invention, while content within a computer program may be transferred via a clipboard and associated clipboard functions to another open compatible computer program on a target client device, when compatible computer programs are not open and/or installed on the target client device, cut and/or copied content from within a computer file may not automatically be saved with the appropriate file type when pasted on the target client device.

Embodiments of the present invention create a virtual container to store pasted content on a target client device irrespective of compatible computer programs being open and/or installed on a target client device that may then be accessed by a user. Additionally, embodiments of the present invention allow for the stored content in the virtual container (e.g., an image file) to revert to the appropriate file type when the compatible computer program becomes available (e.g., installed on the target device).

Figure 1:
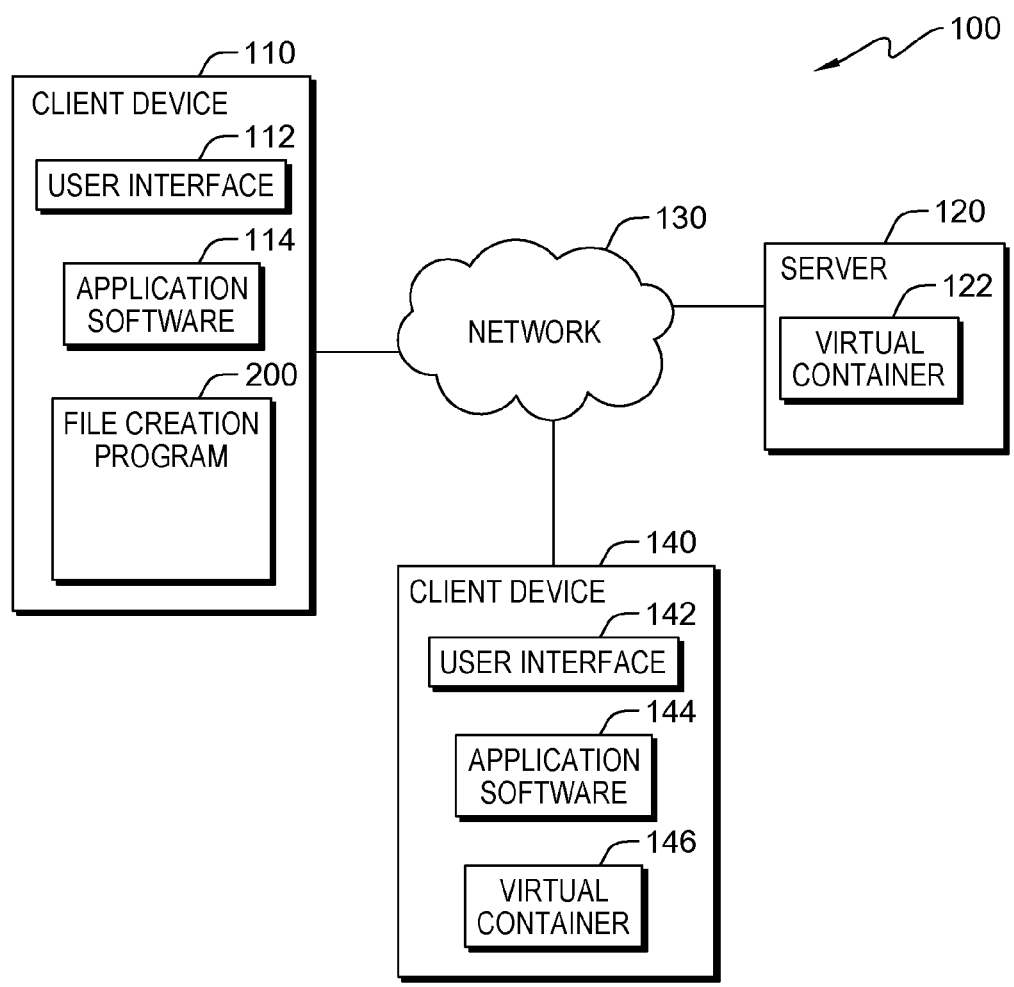
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one embodiment and does not imply any limitations with regard to the environments in which different embodiments may be implemented.

In the depicted embodiment, distributed data processing environment 100 includes client devices 110 and 140 and server 120, all interconnected over network 130. Distributed data processing environment 100 may include additional computing devices, mobile computing devices, servers, computers, storage devices, or other devices not shown.

Client devices 110 and 140 may be a web server or any other electronic device or computing system capable of processing program instructions and receiving and sending data. In some embodiments, client devices 110 and 140 may be a laptop computer, a tablet computer, a netbook computer, a personal computer (PC), a desktop computer, a personal digital assistant (PDA), a smart phone, or any programmable electronic device capable of communicating with network 130. In other embodiments, client devices 110 and 140 may represent a server computing system utilizing multiple computers as a server system, such as in a cloud computing environment. In general, client devices 110 and 140 are representative of any electronic device or combination of electronic devices capable of executing machine readable program instructions as described in greater detail with regard to FIG. 3, in accordance with embodiments of the present invention. Client device 110 contains user interface 112, application software 114, and file creation program 200. Client device 140 contains user interface 142, application software 144, and virtual container 146.

User interfaces 112 and 142 are programs that provide an interface between a user of client devices 110 and 140 and a plurality of applications that reside on client devices 110 and 140 (e.g., application software 114, application software 144, virtual container 146, etc.) and/or may be accessed over network 130. A user interface, such as user interfaces 112 and 142, refers to the information (e.g., graphic, text, sound) that a program presents to a user and the control sequences the user employs to control the program. A variety of types of user interfaces exist. In one embodiment, user interfaces 112 and 142 are graphical user interfaces. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information to file creation program 200.

Application software 114 and 144 are a set of one of more programs designed to carry out the operations for a specific application (e.g., word processing programs, spread sheet programs, media players, web browsers, etc.) to assist a user to perform an activity. In the depicted embodiment, a user of client device 110 through user interface 112 utilizes application software 114 to cut and/or copy a selection (e.g., portion of text, cells, displayed information, etc.) within an open program on client device 110 and selects to paste the selection on client device 140 and/or server 120, which initiates file creation program 200. When application software is installed on a client device, file creation program 200 utilizes the installed application software to determine a file format to assign to the pasted selection. For example, when the user selects to paste the selection on client device 140, file creation program 200 accesses application software 144 and determines the file format to be assigned to the pasted selection based on application software 144. In the depicted embodiment, application software 114 resides on client device 110 and application software 144 resides on client device 140. In another embodiment, application software 114 and application software 144 may reside on server 120 or on another device (not shown) connected over network 130.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 over network 130. In other embodiments, server 120 may represent a server computing system utilizing multiple computers as a server system, such as in a cloud computing environment. Server 120 contains virtual container 122.

Virtual containers 122 and 146 are files created by file creation program 200 that store a cut and/or copied selection from within the data provided by application software (e.g. application software 114) that a user pastes on another client device and or server connected over network 130 where the paste operation is not expected (e.g., read-only file) or where the content is not understood (e.g., file type not recognized, application software 114 or 144 is not active, etc.). For example, cut and/or copy occurs on client device 110, and the paste occurs on server 120 and/or client device 140. Virtual containers 122 and 146 include metadata associated with the application software responsible for the cut and/or copied selection. In one embodiment, virtual containers 122 and 146 may be stored as an image file. In another embodiment, virtual containers 122 and 146 may be stored with a specific file type dependent upon the copied selection, application software 114, and application software 144 that is available on client device 140 and/or server 120 on which the paste occurs.

Virtual containers 122 and 146 are able to store the cut and/or copied selection in a loss-less form, which allows for re-transformation (e.g., revert to an original file type, reconstruct the original version) to be possible when virtual containers 122 and/or 146 are later accessed by a matching instance of application software 114 or 144. For example, initially application software 114 does not include a word processing program to edit a copied selection; and thus, file creation program 200 creates virtual container 146. A compatible word processing program is later installed on client device 140, and when the word processing program opens virtual container 146 instead of an image file, the cut or copied selection reverts to a word processing document that is usable by the word processing program. In the depicted embodiment, virtual container 122 resides on server 120, and virtual container 146 resides on client device 140. In another embodiment, virtual containers 122 and 146 may reside on client device 110. In some other embodiment, virtual containers 122 and 146 may reside on another client device and/or server not shown.

Network 130 may be a local area network (LAN), a wide area network (WAN), such as the Internet, a wireless local area network (WLAN), any combination thereof, or any combination of connections and protocols that will support communications between client device 110, server 120, and other computing devices and servers (not shown), in accordance with embodiments of the inventions. Network 130 may include wired, wireless, or fiber optic connections.

File creation program 200 is a program for creating a file (e.g., virtual container 122 and virtual container 146) in response to a user pasting cut and/or copied selections from a client device, such as client device 110 to client device 140 and/or server 120, where the paste operation is not expected (e.g., read-only file) or where the content is not understood (e.g., file type not recognized, application software 114 or 144 is not active, etc.). For example, a user selects and copies text from a word processing program on client device 110. The user then selects to paste the copied text selection on client device 140; however, the word processing document on client device 140 is set to read only; and therefore, the copied text may not be pasted into the word processing document. In order to transfer the information, file creation program 200 creates virtual container 146 to store the information on client device 140 for future use and/or viewing. In the depicted embodiment, file creation program 200 resides on client device 110. In another embodiment, file creation program 200 may reside on client device 140. In some other embodiment, file creation program 200 may reside on server 120. In yet some other embodiment, file creation program 200 may reside on another client device, server, or multiple client and server devices not currently shown.

Figure 2:
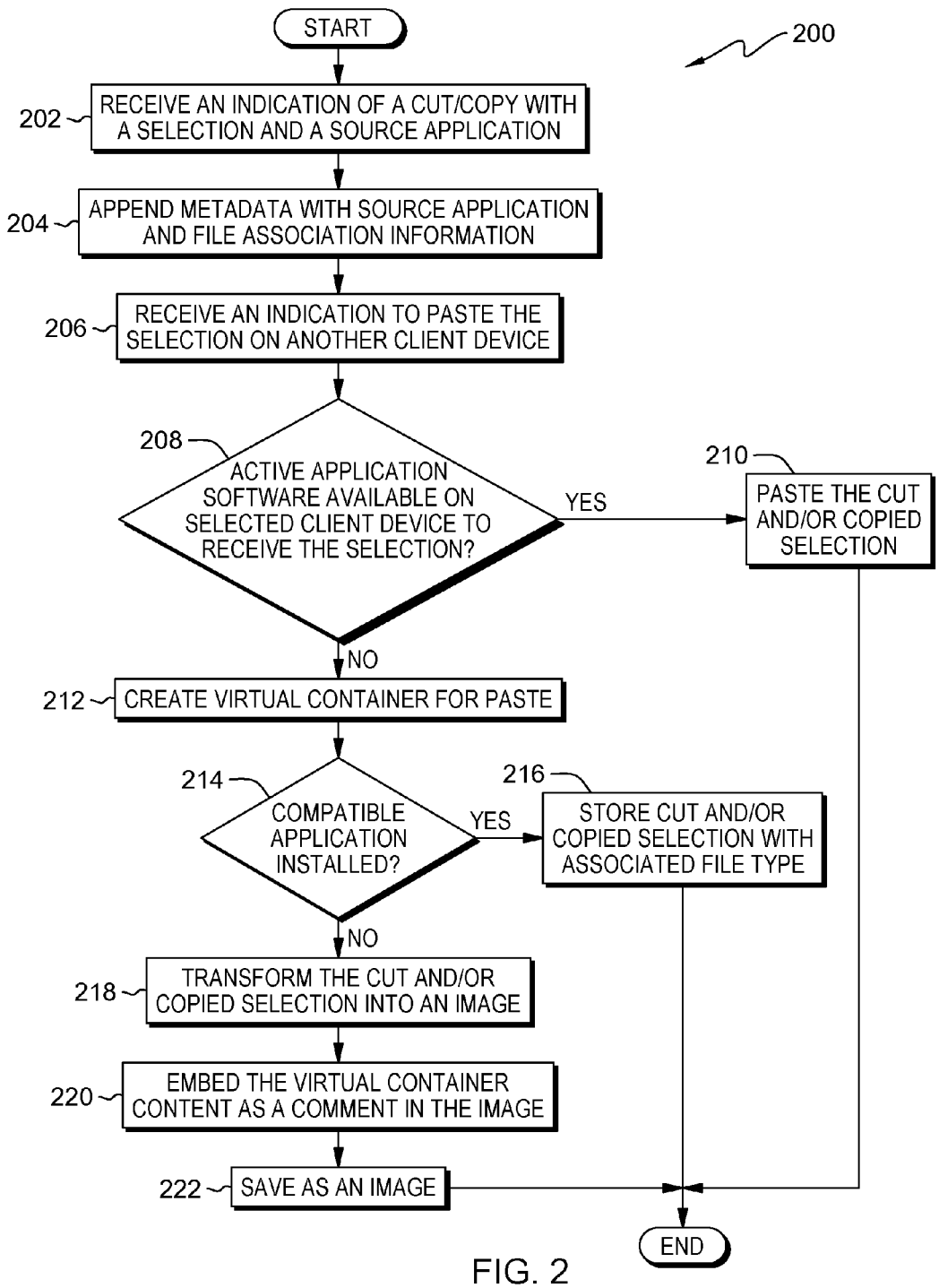
FIG. 2 is a flowchart depicting operational steps of a file creation program, on a computer within the data processing environment of FIG. 1, for creating a virtual container in response to pasting a cut and/or copied selection on another client device, in accordance with an embodiment of the present invention.

FIG. 2 is a flowchart depicting operational steps of file creation program 200, a program for creating a virtual container in response to pasting a cut and/or copied selection on another client device where the paste operation is not expected (e.g., read only) and/or where the content is not understood (e.g., file type not recognized), in accordance with an embodiment of the present invention. In the depicted embodiment, file creation program 200 is running in the background on client device 110. In another embodiment, file creation program 200 may be incorporated within application software 114. In some other embodiment, file creation program 200 may be incorporated within the clipboard to add additional functionality. In yet another embodiment, file creation program 200 may be a selectable program that a user opens in anticipation of transferring content from client device 110 to server 120 and/or client device 140 that may not include compatible application software.

In step 202, file creation program 200 receives an indication of a cut and/or copy function of a selection within application software 114. File creation program 200 initiates when a user of client device 110, through user interface 112, cuts and/or copies selected content (e.g., selection) from within open application software 114. The cut and/or copy function transfers the selected content or a copy of the selected content to a clipboard. For example, a user highlights a text selection from within an open text file through a word processing program. The user then selects the cut and/or copy function that places the selected text on the clipboard and thereby initiates file creation program 200. Once the selected content transfers to the clipboard, file creation program 200 stores and tracks the content transferred to the clipboard.

In step 204, file creation program 200 appends the metadata with information pertaining to application software 114 and file association information. A file association links a file type to the corresponding instance of application software 114 installed on client device 110 or application software 144 installed on client device 140. A file type, also referred to as a file format or file extension, specifies how bits, which store the information of the file, are used to encode information in a digital storage medium that may be specific to a particular type of data or may be designed for storage of several types of data. For example, file types identify image files (e.g., bitmap image file (bmp), tagged image file format (TIFF), joint photographic experts group (JPG), etc.), word processing documents (e.g., documents (doc), text files (txt), portable document format (pdf), etc.), spreadsheets, multimedia files, programming language files, etc. In addition to transferring the selected content to the clipboard, the cut and/or copy function also transfers associated information regarding application software 114 and the file type to the clipboard. In one embodiment, file creation program 200 retrieves the file name, file type, and application software 114 (e.g., program name) from the clipboard. In another embodiment, file creation program 200 may retrieve the file type and the application software. File creation program 200 stores the retrieved information within the metadata of the previously stored content.

For example, cells from within a spreadsheet program are copied and transferred to the clipboard from my_spread_sheet.dif. The file name my_spread_sheet, the file type of ".dif", and the spreadsheet program, from which the cells were copied from, are stored on the clipboard with the copied cells; and therefore, available to file creation program 200. Currently, when the copied cells are pasted in a new location, only the format and content of the spreadsheet cells may be transferred, and the remaining information, such as the file name, the file type, and the program name remain as a record in the clipboard but may no longer be directly associated with the pasted content in the new location. However, file creation program 200 extracts the file type (e.g., .dif), the name of application software 114 (e.g., spreadsheet program), and the file name (e.g., my_spread_sheet) from the clipboard and embeds extracted information within the metadata of the cells. For example, file creation program 200 appends the extracted information to the metadata associated with the cells in the received cut and/or copy operation.

In step 206, file creation program 200 receives an indication to paste the selection from application software 114 on to another client device (e.g., client device 140, server 120). Through user interface 112, the user selects server 120 or client device 140, which are connected to client device 110 over network 130. The user identifies a location within client device 140 or server 120 and performs an action associated with a paste function. In one embodiment, file creation program 200 receives a location and indication to paste the selection through user interactions with a network file manager. A network file manager is a distributed file system that provides a user interface to manage files and folders, allowing a user of a client device to access files over a network similar to local storage (e.g., connects workstations attached to the same computer network). For example, a user accesses a network file manager on client device 110. Through the network file manager, the user of client device 110 may view the local directory structure of client device 110 as well as the directory structure for client device 140 and server 120. Via user interface 112, the user selects client device 140 and navigates to a location within the respective directory structure and initiates a paste function.

In another embodiment, file creation program 200 receives a location and indication to paste the selection when a user initiates a remote desktop on client device 140 or server 120. The remote desktop refers to software or an operating system feature that allows a client device or server to be run remotely on one system while being displayed on a separate client device (e.g., remote control of another client device connected via the Internet or another network). In one embodiment, the user utilizes user interface 112 to select an active instance of application software 144 and initiate a paste function. In another embodiment, the user utilizes user interface 112 to open an instance of application software 144 and initiate a paste function. In some other embodiment, the user utilizes user interface 112 to select a location on client device 140 (e.g., desktop) and initiate a paste function.

For example, a customer support representative may initiate a remote desktop from client device 110 to troubleshoot a customer problem on client device 140 through user interface 112 over network 130. The customer support representative may access client device 140 through remote desktop sharing, which allows the keystrokes and mouse clicks of the customer support representative to be registered on client device 140 instead of on client device 110. However, while utilizing the remote desktop, the customer support representative may switch between client device 110 and client device 140 to perform actions on either client device (e.g., copies information on client device 110 and then switches to client device 140 to paste the copied information). The customer support representative may then select the paste function to initiate a transfer of the cut/copied selection from client device 110 to client device 140 in various manners.

In decision 208, file creation program 200 determines whether active application software is available on the selected client device to receive the cut and/or copied selection. For example, file creation program 200 determines whether the identified paste location includes an active instance of application software 144 that is capable of receiving the cut and/or copied selection from an active instance of application software 114. Active application software refers to software on a client device (e.g., client device 140) that is currently open and running that is therefore capable of receiving the cut and/or copied selection in response to a paste command.

In one embodiment, the user selects and identifies an active instance of application software 144 on client device 140 though user interface 112 while accessing the remote desktop capable of receiving the cut and/or copied selection. In another embodiment, the user may not select an open instance of application software 144, and file creation program 200 may access a task manager on client device 140 or server 120 to determine an active instance of application software. The task manager identifies programs, processes, and services that are currently running on a client device. In one embodiment, file creation program 200 searches the task manager for an exact match between application software 114 and application software 144. In another embodiment, file creation program 200 searches within the task manager for an active instance of application software 144 that is capable of accessing the same file type. For example, word processing programs are capable of opening multiple file types. Application software 144 would therefore not need to be an exact match but merely a compatible word processing program capable of accessing the same file type. In some other embodiment, file creation program 200 searches within the task manager for an active instance of application software 144 capable of receiving the cut and/or copied information as embedded information. For example, a copied table from a spreadsheet program may be pasted within a word processing document or presentation file as an image and/or embedded table.

If file creation program 200 determines that active application software is available on the selected client device to receive the cut and/or copied selection (decision 208, yes branch), then file creation program 200 pastes the cut and/or copied selection (step 210). If file creation program 200 determines that active application software is not available on the selected client device to receive the cut and/or copied selection (decision 208, no branch), then file creation program 200 creates a virtual container for the paste selection (step 212). For example, in the depicted embodiment, server 120 does not include application software; and therefore, file creation program 200 does not identify application software compatible with application software 114 and therefore creates virtual container 122.

In step 210, file creation program 200 pastes the cut and/or copied selection. In one embodiment, file creation program 200 pastes the cut and/or copied selection from application software 114 on client device 110 to active application software 144 on client device 140 based on the user selection. For example, file creation program 200 receives an active word processing program within application software 144 based on the user selection through the remote desktop (e.g., user selects specific active application software 144 and initiates the paste). File creation program 200 completes the paste function and transfers the cut and/or copied selection to active application software 144. In another embodiment, file creation program 200 may select an instance of application software 144 based on the best match and completes the paste function. For example, file creation program 200 selects the same instance of active application software 144 first, followed by an active instance of application software 144 that is capable of processing the same file type, and finally selecting an instance of application software 144 that is capable of receiving embedded information. In some other embodiment, file creation program 200 may provide the user with a list of active instances of application software 144 that are capable of receiving the cut and/or copied information to select from prior to completing the paste function. For example, a notepad program and a word processing program are open and can both receive a cut and/or copied text selection. The user would then select either the notepad program or the word program. After the user makes a selection, the paste function completes.

In step 212, file creation program 200 creates a virtual container for the paste selection. On server 120, file creation program 200 creates virtual container 122. On client device 140, file creation program 200 creates virtual container 146. File creation program 200 creates virtual container 122 or virtual container 146 based on information associated with the cut and/or copied selection from application software 114. A virtual container includes a container identification (e.g., numeric identification), an operating system template (e.g., name of the operating system on which the virtual container is based), and a configuration file (e.g., a file that sets resource control parameters). For example, virtual containers 122 or 146 would include information identifying application software 114 from which the cut and/or copied selection was taken from and the configuration (e.g., format) of the cut and/or copied information.

In decision 214, file creation program 200 determines whether compatible application software (e.g., application software 144) is installed on the selected client device (e.g., client device 140, server 120). File creation program 200 searches for available inactive (e.g., not opened and running) application software that is installed on the selected client device and could therefore be opened at a later time. In one embodiment, file creation program 200 searches client device 140 for installed instances of application software 144 that are identical to application software 114. In another embodiment, file creation program 200 searches client device 140 for installed instances of application software 144 that are capable of processing the same file types as application software 114. For example, a text file created in a notepad program may be opened in a word processing program in addition to a notepad program. In the depicted embodiment, server 120 does not include application software; and therefore, file creation program 200 is unable to locate identical and/or compatible application software and determines identical and/or compatible application software is not installed.

If file creation program 200 determines that compatible application software is available on the selected client device (decision 214, yes branch), then file creation program 200 stores the cut and/or copied selection with the associated file type (step 216). If file creation program 200 determines that compatible application software is not available (decision 214, no branch), then file creation program 200 transforms the cut and/or copied selection into an image (step 218).

In step 216, file creation program 200 stores the cut and/or copied selection with the associated file type (e.g., identical or compatible application software 144 file type). In one embodiment, file creation program 200 updates virtual container 146 with the file type associated with application software 114 (e.g., application software 114 matches installed application software 144). For example, a copied selection included a file type of ".doc". When the user selects to paste the copied selection of client device 140, file creation program 200 determines that a word processing program is not active but is however installed on client device 140. File creation program 200 determines that installed application software 144 and application software 114 are identical (e.g., both application software 114 and 144 access the same file types) and stores virtual container 146 with a ".doc" file type. In another embodiment, file creation program 200 updates virtual container 146 to the file type associated with installed application software 144 (e.g., application software 114 and 144 are not the same but are compatible). As file creation program 200 stores virtual container 146 as a specific file type, when installed application software 144 is later active and accesses virtual container 146, the cut and or copied selection within virtual container 146 opens with the assigned file type and is capable of being viewed and/or edited without a loss of information.

In step 218, file creation program 200 transforms the paste selection into an image. In one embodiment, file creation program 200 may utilize an image converter to change the cut and/or copied selection within virtual container 122 or virtual container 146 into an image file. An image converter changes a file into an image file through compression and formatting changes. However, compression and formatting changes may result in a loss of data when the image conversion compresses the data and/or changes the image size. In another embodiment, file creation program 200 may utilize rendering to change the cut and/or copied selection within virtual container 122 or virtual container 146 into an image file. Rendering is the process of generating an image by means of computer programs by adding bitmap textures, lights, bump mapping, and relative positions to other objects within the cut and/or copied text. The rendered image results in an image stored within virtual container 122 or virtual container 146 that is viewable by a user when later accessed.

In step 220, file creation program 200 embeds the virtual container content as a comment within the image. File creation program 200 updates the metadata of virtual container 122 or virtual container 146 with the original content of the cut and/or copied selection in order to preserve the integrity of the cut/or coped selection in a loss-less form. The original content includes at least the name of the source application software (e.g., application software 114) from which the cut and/or copied selection was taken from, the file type association, and the content. For example, the metadata would indicate the word processing program, the file extension, and the text that was cut and/or copied. In addition, the original content may also include formatting and rendering details (e.g., compression ratio, text formats, sampling, image size, etc.). The original content embedded within the metadata allows for the image file to be re-transformed without a loss of data when accessed by compatible application software 144 when installed and active at a later time.

In step 222, file creation program 200 saves the virtual container as an image file. In one embodiment, file creation program 200 may maintain the file extension from application software 114 (e.g., cut and/or copied selection was from an image file). In another embodiment, file creation program 200 saves virtual container 122 or 146 with a default image file type (e.g., most common file type, most used on the client device, etc.). In some other embodiment, file creation program 200 may provide a list of image file types to the user. The user can utilize user interface 112 to then select the file type from the provided list, and file creation program 200 saves virtual container 122 or virtual container 146 with the selected file type. Once file creation program 200 saves virtual container 122 or virtual container 146 as an image file with the updated metadata, file creation program 200 completes.

After completion in another user session, a user of client device 140 can utilize user interface 142 to select to open virtual container 146. In one embodiment, the user may view an image of the information within virtual container 146 (e.g., installed application software 144 does not include the original program or a program compatible with the assigned file type). In another embodiment, when client device 140 includes an active and installed instance of application software 144 that is capable of viewing the original image, as virtual container 146 includes the metadata with the original content, the cut and/or copied selection may revert to the original file type in a loss-less form that may be viewed and/or edited. For example, a user later opens a word processing program and selects to open virtual container 146. The word processing program may recognize the file type and/or the program name stored within the metadata of virtual container 146 and reverts virtual container 146 back to the original form, which may then be viewed and/or edited by the word processing program. In some other embodiment, the user may be provided with an option to transform virtual container 146 back to the original form or open virtual container 146 as an image file.

Figure 3:
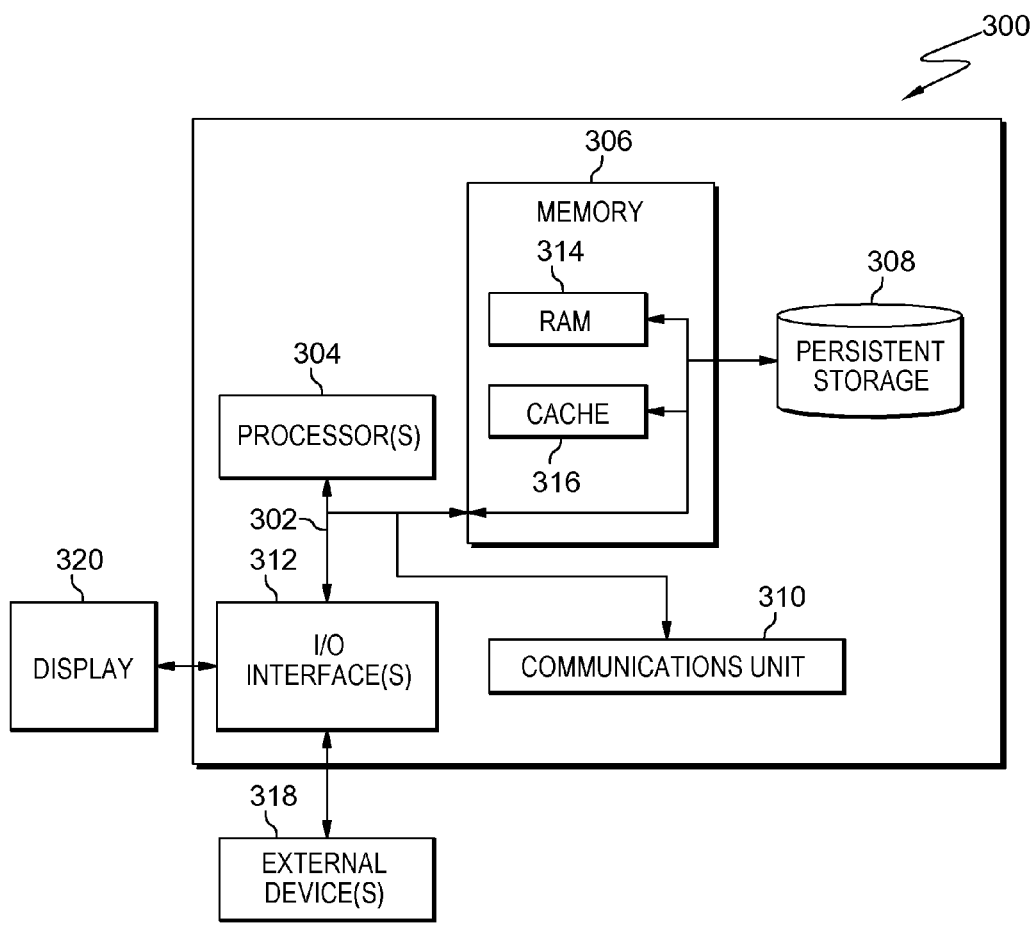
FIG. 3 is a block diagram of components of the computer executing the file creation program, in accordance with an embodiment of the present invention.

FIG. 3 depicts computer 300 that is an example of a system that includes file creation program 200. It should be appreciated that FIG. 3 provides only an illustration of one implementation and does not imply any limitations with regard to the environments in which different embodiments may be implemented. Many modifications to the depicted environment may be made.

Computer 300 includes processor(s) 304, cache 316, memory 306, persistent storage 308, communications unit 310, input/output (I/O) interface(s) 312, and communications fabric 302. Communications fabric 302 provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM) 314. In general, memory 306 can include any suitable volatile or non-volatile computer readable storage media. Cache 316 is a fast memory that enhances the performance of processor(s) 304 by holding recently accessed data, and data near recently accessed data, from memory 306.

Program instructions and data used to practice embodiments of the present invention may be stored in persistent storage 308 and in memory 306 for execution by one or more of the respective processor(s) 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data used to practice embodiments of the present invention may be downloaded to persistent storage 308 through communications unit 310.

I/O interface(s) 312 allows for input and output of data with other devices that may be connected to each computer system. For example, I/O interface(s) 312 may provide a connection to external device(s) 318, such as a keyboard, a keypad, a touch screen, and/or some other suitable input device. External device(s) 318 can also include portable computer readable storage media, such as, for example, thumb drives, portable optical or magnetic disks, and memory cards. Software and data used to practice embodiments of the present invention, e.g., user interface 112, user interface 142, application software 114, application software 144, virtual container 122, virtual container 146, and file creation program 200 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for creating a file, the computer program product comprising:
   one or more non-transitory computer readable storage media and program instructions stored on the one or more computer readable storage media, the program instructions comprising:
   program instructions to receive a selection of content within application software on a first computing device to transfer to a clipboard;
   program instructions to append metadata of the received selection with metadata indicating application software and file association information that corresponds to the selected content;
   program instructions to receive an indication to paste the selected content from the clipboard to a second computing device;
   program instructions to determine whether compatible application software is active on the second computing device that is capable of accepting the selected content included in the received indication to paste;
   responsive to determining compatible application software is not active on the second computing device, program instructions to create a virtual container;
   program instructions to store the selected content included in the received indication to paste and append metadata within the created virtual container;
   program instructions to determine whether compatible application software is installed on the second computing device;
   responsive to determining compatible application software is not installed on the second computing device, program instructions to transform the created virtual container into an image file; and
   program instructions to embed metadata of the image file with the content of a virtual container.

* * * * *